(12) United States Patent
Abrol

(10) Patent No.: US 6,507,582 B1
(45) Date of Patent: Jan. 14, 2003

(54) RADIO LINK PROTOCOL ENHANCEMENTS FOR DYNAMIC CAPACITY WIRELESS DATA CHANNELS

(75) Inventor: Nischal Abrol, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/321,296

(22) Filed: May 27, 1999

(51) Int. Cl.[7] .......................... H04L 12/28; H04B 7/212
(52) U.S. Cl. ........................ 370/394; 370/252; 370/335; 370/342
(58) Field of Search ............................. 370/246, 389, 370/252, 392, 393, 465, 473, 474, 475, 394, 335, 342; 348/384; 345/132, 153; 714/782, 701

(56) References Cited

U.S. PATENT DOCUMENTS

| | | | | |
|---|---|---|---|---|
| 4,617,657 A | * | 10/1986 | Drynan et al. | 370/394 |
| 5,151,899 A | | 9/1992 | Thomas et al. | 370/94.1 |
| 5,444,709 A | | 8/1995 | Riddle | 370/94.1 |
| 5,703,902 A | * | 12/1997 | Ziv et al. | 370/228 |
| 5,771,033 A | * | 6/1998 | Katzenberger | 345/132 |
| 5,793,744 A | * | 8/1998 | Kanerva et al. | 370/209 |
| 5,920,352 A | * | 7/1999 | Inoue | 348/384 |
| 6,011,806 A | * | 1/2000 | Herring | 370/494 |
| 6,088,342 A | * | 7/2000 | Cheng et al. | 370/320 |

OTHER PUBLICATIONS

TIA/EIA/IS–707–A.2 "Data Service Options for Spread Spectrum Systems: Radio Link Protocol" pp. i–section 4–11 (Mar. 1999).
TIA/EIA–707–A.8 "Data Service Options for Spread Spectrum Systems: Radio Link Protocol Type 2" pp. i–section 4–12 (Mar. 1999).

* cited by examiner

Primary Examiner—Steven Nguyen
Assistant Examiner—Phuongchau Ba Nguyen
(74) Attorney, Agent, or Firm—Philip Wadsworth; Kent D. Baker; Byron Yafuso

(57) ABSTRACT

An improved method and system for transmitting a stream of data bytes through a channel whose capacity may change during transmission. By utilization of selective regions of sequence number space, the enhanced radio link protocol (RLP) provides the benefits of large byte sequence numbers while transmitting a fraction of the sequence number bits in the majority of over-the-air frames. Frame header sequence numbers are shortened by dividing the byte sequence number by a page size, and by performing a modulo function on the byte sequence number.

12 Claims, 6 Drawing Sheets

RADIO LINK PROTOCOL ENHANCEMENTS FOR DYNAMIC CAPACITY WIRELESS DATA CHANNELS

BACKGROUND OF THE INVENTION

I. Field of the Invention

The current invention relates to wireless communications. More particularly, the present invention relates to an improved method and system for reliably transmitting data through a wireless channel while minimizing the overhead inherent in the error control protocol.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95.

IS-95 was originally optimized for transmission of variable-rate voice frames. In order to support two-way voice communications, as typified in wireless phone applications, it is desirable that a communication system provide fairly constant and minimal data delay. For this reason, IS-95 systems are designed with powerful forward error correction (FEC) protocols and vocoders which are designed to respond gracefully to voice frame errors. Error control protocols which require frame retransmission procedures add unacceptable delays to voice transmission, so are not designed into the IS-95 specification.

The optimizations which make the standalone IS-95 specification ideal for voice applications make it difficult to use for packet data applications. In many non-voice applications, such as the transmission of Internet protocol (IP) data, the delay requirements of the communication system are much less stringent than in voice applications. In the Transmission Control Protocol (TCP), probably the most prevalent of protocols used in an IP network, virtually infinite transmission delays are allowed in order to guarantee error-free transmission. TCP uses retransmissions of IP datagrams, as IP packets are commonly called, to provide this transport reliability.

IP datagrams are generally too large to fit into a single IS-95 frame. Even after dividing an IP datagram into segments small enough to fit into a series of IS-95 frames, an entire series of IS-95 frames would have to be received without error for the single IP datagram to be useful to TCP. The frame error rate typical of an IS-95 system make the probability of error-free reception of all segments of a single datagram very low.

As described in IS-95, alternative service options enable the transmission of other types of data in lieu of voice frames. The TIA/EIA/IS-707-A, entitled "DATA SERVICE OPTIONS FOR SPREAD SPECTRUM SYSTEMS", hereafter referred to as IS-707, describes procedures used in the transmission of packet data in an IS-95 system.

Radio Link Protocol (RLP) is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2, and incorporated herein by reference. RLP2 incorporates an error control protocol with frame retransmission procedures over the IS-95 frame layer. RLP is of a class of error control protocols known as NAK-based ARQ protocols, which are well known in the art. The IS-707 RLP, facilitates the transmission of a byte-stream, rather than a series of voice frames, through an IS-95 communication system.

Several protocol layers typically reside above the RLP layer. IP datagrams, for example, are typically converted into a Point-To-Point Protocol (PPP) byte stream before being presented as a byte stream to the RLP protocol layer. As the RLP layer ignores the protocol and framing of higher protocol layers, the stream of data transported by RLP is said to be a "featureless byte stream".

RLP was originally designed to satisfy the requirements of sending large frames through an IS-95 channel. For example, if an IP datagram of 500 bytes were to be simply sent in IS-95 frames carrying 20 bytes each, the IP datagram would fill 25 consecutive IS-95 frames. Without some kind of error control layer, all 25 of these frames would have to be received without error in order for the IP datagram to be useful to higher protocol layers. On an IS-95 channel having a 1% frame error rate, the effective error rate of the IP datagram delivery would be $(1-(0.99)^{25})$, or 22%. This is a very high error rate compared to most networks used to carry Internet Protocol traffic. RLP was designed as a link layer protocol which would decrease the error rate of IP traffic to be comparable to the error rate typical of a 10Base2 ethernet channel.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission", and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as W-CDMA. A third proposal was submitted by U.S. TG 8/1 entitled "The UWC-136 Candidate Submission", hereinafter referred to as EDGE. The contents of these submissions are public record and are well known in the art.

RLP2 is optimized for use with IS-95B, in which the rate set, derived from channel capacity, and used during a packet data call remains essentially fixed for the duration of the call. Based on this assumption of fixed rate sets, RLP2 is designed with the assumption that retransmitted RLP frames can be sent within a maximum of three consecutive RLP segments. The probability that one of three segments is lost, causing the loss of a retransmitted RLP frame, has been deemed acceptable by the designers of RLP2.

In cdma2000, however, the channel capacity available to a single user, and hence the maximum data rate used during a packet data call, can vary widely and rapidly. For example, during the course of a single cdma2000 call, the supplemental channel capacity used by a packet data service option may vary from 9.6 kilo-bits per second (kbps) to more than 307 kbps. In a simple extension of the RLP2, the maximum number of segments used during retransmissions could be increased as necessary to accommodate the change in data rates. Because the capacity of a call channel may diminish during a call, a full-rate frame transmitted unsuccessfully at a high rate might span 30 or more consecutive lower-rate-set cdma2000 segments. The high likelihood that one or more of those cdma2000 segments makes such a simple extension of the RLP2 largely impractical for use with cdma2000.

RLP2 has been optimized to require minimal protocol overhead space over the two IS-95 rate sets, known as Rate Set 1 (RS1) and Rate Set 2 (RS2). The RLP frame sequence numbers in RLP2 are 8 bits long, a size which is ideal for computer processing. Since the rate sets specified in cdma2000 include RS1 and RS2, it would be highly desirable for an RLP designed for cdma2000 (RLP2000) to be at least as efficient as RLP2 mwhen used at RS1 and RS2. Because switching RLP protocols whenever the rate set changes would add complexity to RLP2000, it is desirable that a single RLP2000 protocol efficiently support RS1, RS2, and all the higher cdma2000 data rates without requiring resynchronization or substantial protocol complexity.

SUMMARY OF THE INVENTION

The present invention may be used to design an enhanced RLP to enable efficient transmission of a featureless byte stream through a channel of varying capacity. An exemplary embodiment of the invention is as efficient as RLP2 when used over a channel having the same capacity as IS-95 RS1 and RS2. At the same time, an enhanced RLP, designed in accordance with the current invention, also enables efficient transmission of data at varying channel capacities up to and exceeding the maximum specified in cdma2000. The present invention is applicable to any communication system employing transmission of a byte stream over a wireless channel. The present invention is applicable to systems such as cdma2000, W-CDMA, and EDGE, wherein a byte stream may be carried within over-the-air frames specified for use by the wireless communication system.

The efficiency of the embodiments of the invention at varying rates is made possible by changing the interpretation of the sequence numbers carried in the RLP protocol header. In RLP2, sequence numbers are used to denote frame numbers. This is appropriate for RLP2, as the channel capacity used in a packet data call, and hence the maximum number of data bytes carried in a full-rate frame, are both constant. RLP2 uses a one-byte frame sequence number, and frames are transmitted at 20 millisecond (ms) intervals. When an RLP2 frame is lost during transmission, the data of the lost frame is segmented into as many as three retransmit segments, each having the same sequence number as the original lost frame.

In trying to adapt RLP2 for use over channels with widely varying capacity, difficulty arises when a frame transmitted on a high-capacity channel (for example, 307 kbps) must be retransmitted on a low-capacity channel (for example, 9.6 kbps). Using a frame interval of 20 ms, a full-rate frame on a 307 kbps channel could carry as many as 750 bytes of data. Such a frame could be lost during transmission, and at the same time, the channel capacity might be reduced to 9.6 kbps. In RLP2, the capacity of a 9.6 kbps full-rate 20 ms frame is 20 bytes. In a simple extension of the maximum allowable retransmission segments, successful retransmission of a single frame of 750 bytes of data would require successful transmission of approximately 38 consecutive 9.6 kbps full-rate RLP2 retransmit segments. Because all retransmit segments would have the same sequence number, the loss of one of those 38 retransmit segments would cause the loss of the entire retransmitted frame. The receiver could not negatively-acknowledge (NAK) individual retransmit segments. If the over-the-air frame error rate were 1%, the probability of successful transmission of 38 consecutive full-rate RLP2 retransmit segments would be approximately 68%. In this scenario, the retransmission of the segments would often fail, causing data loss and a break in the byte stream due to RLP2 resynchronization. Thus, such a simple extension of RLP2 would frequently result in lost data whenever a high-capacity full-rate frame had to be retransmitted over a low-capacity channel.

One way to accomplish more reliable data retransmission would be to use a byte sequence number in the RLP header instead of a frame sequence number. Then, upon the loss of a large, high-rate RLP frame followed closely by a decrease in channel capacity, the data in the lost frame could be divided into small, independent RLP retransmit frames. The receiver would not be required to receive 38 consecutive retransmit frames without error. The receiver could accept whichever retransmit frames it successfully received and simply negatively acknowledge (NAK) any lost retransmitted frames. Again using an over-the-air frame error rate of 1%, the probability of the same retransmit segment being lost twice in a row would be 0.01%.

One disadvantage of using a byte sequence number instead of a frame sequence number is the larger number of bits in a byte sequence number to represent the same data. If a byte sequence number were used in a 9.6 kbps full-rate RLP2 frame, the sequence number would have to be 5 bits longer than the 8-bit frame sequence number. In cdma2000, where channel capacity may vary from 9.6 kbps to 32 times that capacity (approximately 307 kbps), a full-rate 307 kbps frame could carry as many as 750 RLP data bytes. The number of byte sequence number bits necessary to track the same duration of 20-millisecond frames as in RLP2 is at least 18 bits. To make room for an 18-bit byte sequence number in a 9.6 kbps RLP frame, the frame would be able to carry two fewer data bytes, a decrease of 10%.

The embodiments of the invention provide the benefits of large byte sequence numbers while transmitting a fraction of the sequence number bits in the majority of over-the-air frames. In one embodiment of the invention, a 20-bit byte sequence number is used to track received data. The number of bytes which may be tracked with a sequence number is called the sequence number space. In the case of a 20-bit sequence number, the size of the sequence number space is $2^{20}$.

Gaining the benefits of a large sequence number without adding to the average frame header size is accomplished by carefully selecting portions of the sequence number space which will go unassigned to transmitted data bytes. In other words, some of the sequence number space will not be used to track actual transmitted bytes, and may be viewed as wasted. The size of the sequence number is chosen such that wastage of the sequence number space is permissible without impacting the performance of the protocol. For example, if an 18-bit sequence number is necessary to endure a 5-second transmission loss on a 307 kbps channel, the use of a 20-bit sequence number allows three fourths of the sequence number space to go unused without impacting the maximum allowable length of transmission loss.

The unused portion of sequence number space is chosen such that the first byte of each new transmitted data frame starts at a predetermined distance, called a page size, from the first byte of the previous data frame. For example, if the first byte in frame n has a sequence number of 1000, and the page size is 100, the first byte of frame n+1 will start on the next page with a sequence number of 1100. If frame n only carries 40 bytes, numbered 1000 to 1039, then the sequence number space from 1040 to 1099 would go unused. The motivation to allow the seeming waste of sequence number space allows a decrease in the bit size of the sequence number sent in the frame. In the example just shown, the sequence number could be divided by 100 before inserting it into the frame, and could therefore be represented by at least 6 fewer bits. In a preferred embodiment of the invention, page sizes are powers of 2, such as 64, to facilitate computer software manipulation of sequence numbers.

In the previously described scenario, in which a 750 data bytes in a high-rate frame are lost, the preferred embodiment of the invention easily adapts to retransmission on high capacity and low capacity channels alike. In a high capacity channel, the data is easily retransmitted in one or two retransmit frames. If, however, the capacity of the channel has decreased, the data bytes to be retransmitted are divided among several independent retransmit frames, each having its own sequence number. The use of independent retransmit sequence numbers has advantages over the segmented retransmission specified by RLP2. If a single RLP2 retransmit segment is lost in transmission, then all the segments carrying the same sequence number must be again retransmitted in order to recover the data of the lost segment. In contrast, if one or more of the independently-numbered retransmit frames are lost in transmission, the receiver can negatively-acknowledge (NAK) the individual, lost retransmit frame. After receiving the second NAK, the transmitter may send the individual retransmit frame for a second time. Again, using an over-the-air frame error rate of 1%, the probability of the same retransmit frame being lost twice in a row is 0.01%. RLP resynchronization, its associated data loss, and byte stream discontinuity, is rarely necessary.

One disadvantage of using sequence numbers corresponding to bytes instead of frames is that more bits are generally needed to represent the sequence number. This can cause a slight increase in the number of independently-numbered retransmit frames needed to carry the data of a lost frame. In an exemplary embodiment of the invention, however, this impact is minimized by sometimes omitting most significant and least significant bits from the sequence number.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
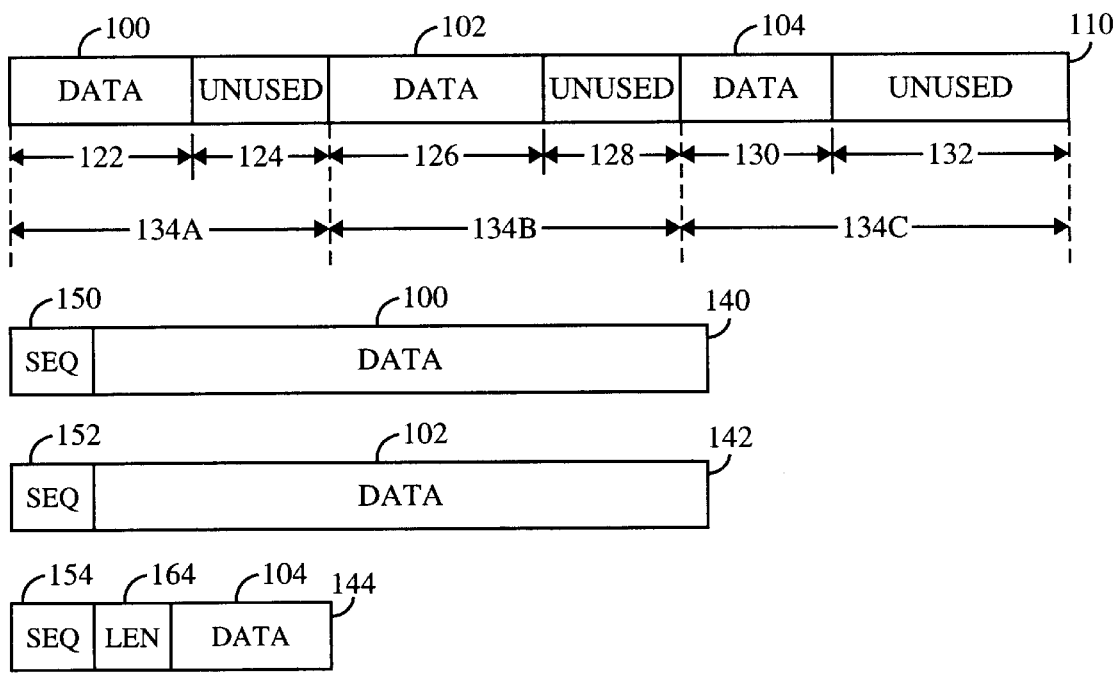
FIG. 1 is a diagram of sequence number space and its use in several new RLP frames in accordance with an embodiment of the invention.

FIG. 1 shows how sequence number space is used in an embodiment of the invention. New data 100 to be transmitted is placed into full-rate RLP frame 140. Within RLP frame 140 are a sequence number 150 and the data 100. New data 102 to be transmitted is placed into full-rate RLP frame 142. Within RLP frame 142 are a sequence number 152 and the data 102.

If new data 104 has fewer bytes than the maximum for a full-rate RLP frame, it is placed into non-full-rate RLP frame 144. Within RLP frame 144 are not only a sequence number 154 and the data 104, but also a data length 164. As with RLP2, this embodiment of the invention allows the use of lower-rate frames within a given channel capacity, for example half-rate frames in a 9600 bps channel, to carry smaller RLP frames.

In an exemplary embodiment of the invention, each sequence number corresponds to the first byte of the data in the RLP frame. The sequence number carried within an RLP frame is called the RLP sequence number.

The data 100, 102, and 104 transmitted in the three RLP frames 140, 142, and 144, reside within sequence number space 110. In an exemplary embodiment of the invention, the sequence numbers are byte sequence numbers, proceeding sequentially from low values on the left to high values on the right. In the current embodiment, as sequence numbers are either used or skipped, they increase monotonically. When a predetermined maximum sequence number value is reached, the sequence numbers begin again at zero.

As the data bytes 102 are placed into RLP frame 142, they are each assigned sequential byte numbers from a block of sequence numbers 126. In an exemplary embodiment, the first byte of block 126 is a predetermined numeric distance 134a from the first byte of block 122 used to transmit the previous RLP frame. This predetermined distance is called a page size, and sequence numbers within the predetermined distance are collectively called a page. The sequence number block used to send data always starts at the beginning of a page. For example, sequence number block 122 starts at the beginning of page 134a, sequence number block 126 starts at the beginning of page 134b, sequence number block 130 starts at the beginning of page 134c. One side-effect of always starting a new frame at the beginning of a page is that a block of sequence numbers at the end of a page, for example 124, 128, and 132, may not be assigned to transmitted data bytes.

In an exemplary embodiment of the invention, a shortened RLP sequence number is used, which is equal to the byte sequence number of the first data byte in the RLP frame divided by the page size. The number of bits required to represent a shortened RLP sequence number is fewer than the bits required to represent the actual byte sequence number.

In another embodiment of the invention, the most-significant bits are also omitted from the byte sequence number when such omission causes no ambiguity about which data is contained in the data portion of the RLP frame. For example, if a byte sequence number of 20 bits is used, but fewer than $2^{16}$ bytes are outstanding (have not been explicitly or implicitly acknowledged), the most significant 4 bits of the byte sequence number need not be sent in the RLP sequence number. These 4 most significant bits can be safely omitted from the RLP sequence number without causing ambiguity in the sequence numbers of the bytes contained in the frame.

Though the shortening of the sequence number is portrayed herein as omitting a number of most significant bits from the sequence number, one skilled in the art will appreciate that the same result may be obtained by performing a modulo function on the sequence number without departing from the current invention.

If, however, more than $2^{16}$ bytes are outstanding, it may be that more than one of the outstanding data bytes have the same shortened RLP sequence number. In an exemplary embodiment of the invention, retransmit frames carrying such data bytes will include the entire 20-bit sequence number.

When an RLP frame is negatively acknowledged (NAK'd) and must be retransmitted, the data is inserted into RLP retransmit frames and retransmitted. If the channel capacity during retransmission is sufficient, then the retransmit frame is the same size as the original, lost RLP frame. In the case where the retransmit frame and the original RLP frame are the same size, the retransmit frame may use the same shortened RLP sequence number as the original, as long as doing so causes no sequence number ambiguity.

If an original transmit frame carries more data than will fit into a single retransmit frame, as is possible when channel capacity decreases, then the data from the original transmit frame is divided among several smaller retransmit frames. Each retransmit frame contains its own RLP sequence number, which may or may not be shortened in one of the ways previously discussed. If a retransmit frame is lost during transmission, that individual retransmit frame may be NAK'd, and subsequently retransmitted. In the rare event that channel capacity decreases before a retransmit frame is NAK'd, the data in that retransmit frame may be further divided among even smaller, independent retransmit frames before their second retransmission.

This procedure differs from RLP2, in which retransmit segments corresponding to a single lost frame all carry the same RLP sequence number. In order to recover the data in a single, lost retransmit segment, all retransmit segments carrying the sequence number of the lost frame must again be retransmitted.

time of transmission of the original RLP frame and the retransmission of its data.

In the example shown, the sequence number space 228 used to represent the bytes in the original, lost RLP frame is divided among several RLP retransmit frames 230. Sequence number space 228 is divided into smaller portions 220, each having a size less than or equal to the capacity of full-rate frames on the current transmit channel. The data 200 corresponding to each of the smaller sequence number space portions 220 is placed into an RLP retransmit frame 230.

Each RLP retransmit segment has an RLP sequence number 240 corresponding to the first byte of its respective sequence number space 220. For example, sequence number $240_a$ has a value representative of the first value in sequence number space $220_a$. The RLP sequence number 240 in each retransmit frame 230 may optionally be shortened in the same ways as discussed for RLP sequence numbers as long as doing so causes no sequence number ambiguity.

Each RLP retransmit frame may optionally have a data length 250. The data length 250 carried by each RLP retransmit frame indicates the number of data bytes 200 within the frame. For example, data length $250_a$ is equal to the number of data bytes $200_a$ in retransmit frame $230_a$. If the length of data is indicated in other parts of the retransmit frame 230, for example in a type field not shown in the figure, the data length field 250 may be omitted.

Formation of RLP retransmit frames continues until the last portion of data $200_n$ is placed into an RLP retransmit frame $230_n$. The last in a series of RLP retransmit frames often contains fewer than the maximum number of data bytes $200_n$, and so typically contains a data length $250_n$.

In the preferred embodiment of the invention, RLP sequence numbers for the most common transmit frames are shortened by omitting the least significant bits and most significant bits. In an exemplary embodiment of the invention, the byte sequence number has 20 bits, a page size of 64 bytes is used, and the number of outstanding RLP transmit frames rarely exceeds 256.

TABLE 1

Example RLP Frame Headers

| Type bits | Bit 0–Bit 1 | Bit 2 | Bit 3 | Bit 4–Bit 7 | Byte 1 | Byte 2 | Byte 3 | Frame Type Descriptions |
|---|---|---|---|---|---|---|---|---|
| 11 | 8 bit seq # | | | | Data | | | 1. New: 8-bit RLP sequence number |
| 10 | 8 bit seq # | | | | Data | | | 2. Retransmit: 8-bit RLP sequence number |
| 01 | 8 bit seq # | | | | Len | Data | | 3. New: 8-bit RLP sequence number, 8-bit length |
| 00 | 11 | 14 bit seq # | | | | Data | | 4. 14-bit RLP sequence number, No length |
| 00 | 10 | 14 bit seq # | | | | Len | Data | 5. 14-bit RLP sequence number, 8-bit length |
| 00 | 01 | 14 bit seq # | | | | Length | | 6. 14-bit RLP sequence number 16-bit length |
| 00 | 00 | 1 | 1 | 20 bit seq # | | | Len | 7. Retransmit: Move to next page boundary. |
| 00 | 00 | 1 | 0 | 20 bit seq # | | | Len | 8. Retransmit: Don't move to next page boundary |
| 00 | 00 | 0 | | More formats for NAKs, Status, SYNC, ACK, SYNC/ACK, Idle, End of Frame | | | | 9. Extended control/sequence |

Figure 2:
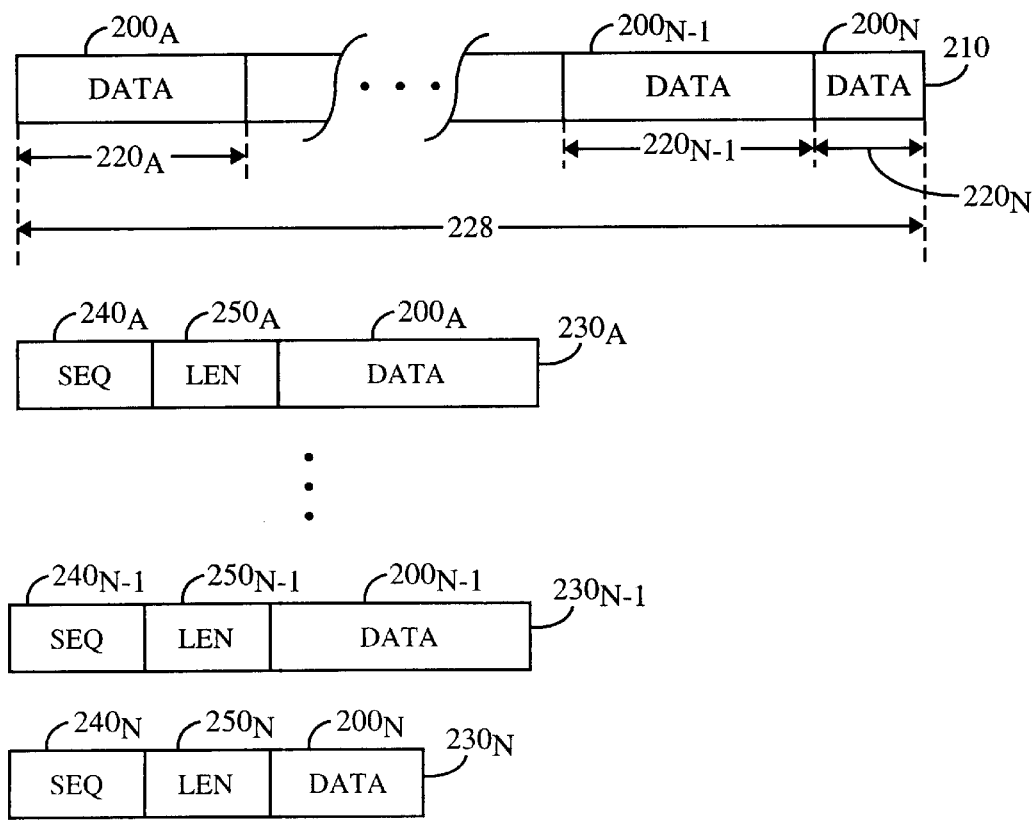
FIG. 2 is a diagram of sequence number space and its use in several RLP retransmit frames in accordance with an embodiment of the invention.

FIG. 2. shows the use of byte sequence number space and RLP sequence numbers when the data in a lost RLP frame must be retransmitted in several smaller RLP retransmit frames, and in accordance with an exemplary embodiment of the invention. The division of retransmit bytes may be necessary when channel capacity is reduced between the Table 1 shows the fields of RLP frame headers used in accordance with the preferred embodiment of the invention. The contents of the frame headers may be placed at the beginning, the end, or dispersed deterministically throughout the RLP frame. In the preferred embodiment of the invention, the RLP frame header appears at the beginning of each RLP frame. Dispersion of the contents of the header throughout the frame may be desirable if a non-uniform probability of bit error exists throughout the RLP frame when received by the receiver.

A varying number of type bits are used to denote RLP frame type. Collectively, these type bits form a variable-bit-length type field, which indicates the type of RLP frame being transmitted, as well as the format of the rest of the RLP header. In Table 1, the "Frame Type Descriptions" column contains a description of the frame type corresponding to each type field value. The frame type descriptions in the "Frame Type Descriptions" column are identified with frame type numbers for purposes of discussion. All columns except the "Frame Type Descriptions" column show fields actually contained in the RLP header.

The type field is followed by the RLP sequence number. When possible without causing sequence number ambiguity, shortened RLP sequence numbers of 8 bits are used. At other times, shortened RLP sequence numbers of 14 bits or full 20-bit RLP sequence numbers are contained by the RLP header.

Shortened RLP sequence numbers of 8 bits are generated from the 20-bit byte sequence number corresponding to the first data byte in the frame. A 20-bit byte sequence number is converted to an 8-bit shortened RLP sequence number by omitting the least significant 6 bits and the most significant 6 bits of the byte sequence number. The use of an 8-bit RLP sequence number is particularly advantageous, as 8-bit numbers are more easily manipulated by most modern microprocessors and in modem software. In the preferred embodiment of the invention, the enhanced RLP protocol is designed to maximize the number of RLP frames transmitted with 8-bit RLP sequence numbers.

A 20-bit byte sequence number is converted to an 14-b it shortened RLP sequence number by omitting the least significant 6 bits of the byte sequence number. When a 20-bit RLP sequence number is to be sent in an RLP frame, the 20-bit byte sequence number is simply copied into the RLP sequence number.

In the preferred embodiment of the invention, most frames carrying data to be transmitted for the first time use an 8-bit RLP sequence number. These frame types are identified in the "Frame Type Descriptions" column as types 1 and 3. In addition, RLP retransmit frames may also use 8-bit RLP sequence numbers, as indicated by type 2.

Frame types 4, 5, and 6 contain 14-bit RLP sequence numbers. These frames may optionally be used to avoid sequence number ambiguity in the event that an outstanding frame has the same 8-bit RLP sequence number as would otherwise be used by the next frame to be transmitted. These frames may also be optionally used in retransmitting data from negatively-acknowledged (NAK'd) frames.

Frame types 7 and 8 contain full 20-bit RLP sequence numbers. These frames are used when channel capacity decreases before NAK'd data can be retransmitted in fewer retransmit frames.

Here is an example of the use of retransmit frame types when channel capacity is reduced before retransmission. 750 bytes of data, bearing byte sequence numbers 1000 to 1749, are lost during transmission of a single RLP transmit frame on a 307 kbps channel. By the time the receiver sends a NAK frame back to the transmitter, the channel capacity has been reduced to 9.6 kbps. The 750 bytes of lost data must now be retransmitted over a 9.6 kbps channel. In using FIG. 2 to represent this scenario, sequence number space 228 is the range of sequence numbers from 1000 to 1749. In a simple extension of RLP2, each retransmit frame using a frame type 8 header on a 9.6 kbps channel carries 15 bytes of data. Using this as an example, the 750 bytes of retransmit data would be distributed among 50 RLP retransmit frames. In FIG. 2, RLP retransmit frame $230_a$ would have a frame type 8 header with a 20-bit sequence number of 1000 and a length of 15. With n=50, Frame $230_{n-1}$ would have a frame type 8 header with a 20-bit sequence number of 1720 and a length of 15. The use of frame type 8 indicates to the receiver that there are more data bytes assigned to the sequence number space between the retransmit frame and the next page boundary. Frame $230_n$ would have a frame type 7 header with a 20-bit sequence number of 1735 and a length of 15. The use of frame type 7 in the last retransmit frame indicates to the receiver that there is no data assigned to the sequence number space between the last byte in the frame and the next page boundary. Any frames of type 7 or 8 may be individually NAK'd and again retransmitted. In a simple improvement of the previous example, a variation of frame type 8 has a header with no length byte, allowing the frame to carry 16 bytes of data.

Frame type 9 carries the control/sequence frames used for synchronization in an RLP protocol. The use of control/sequence frames is described in the detail in the aforementioned RLP2.

In frame headers having no length field, the data length is interpreted to be the maximum number of bytes which can fit into the remainder of the transmitted frame. In this way, the enhanced RLP protocol described herein is easily extensible for use in channels having greater capacity than specified in aforementioned RLP2 or cdma2000. In many anticipated extensions, no modification of the enhanced RLP protocol would be necessary to accommodate new channel capacities.

The receiver, upon receiving RLP frames in the formats described herein, use shortened sequence numbers to reproduce the original byte sequence numbers to be applied to the bytes contained in each RLP frame. When a frame is received whose RLP sequence number indicates the loss of one or more preceding frames, the receiver sends a NAK to the transmitter. The NAK frame may optionally specify the number of bits to be used in the RLP sequence number of the corresponding RLP retransmit frame.

Though the preferred embodiment of the invention specifies the use of 20-bit byte sequence numbers and 8-, 14-, and 20-bit RLP sequence numbers, many other choices of sequence number sizes may be made without departing from the current invention. The use of RLP sequence numbers which enable unambiguous omission of most significant or least significant portions of the byte sequence number space are objects of various embodiments of the current invention, as are the selection of page sizes which are powers of 2 and the use of 8-bit shortened RLP sequence numbers.

Figure 3:
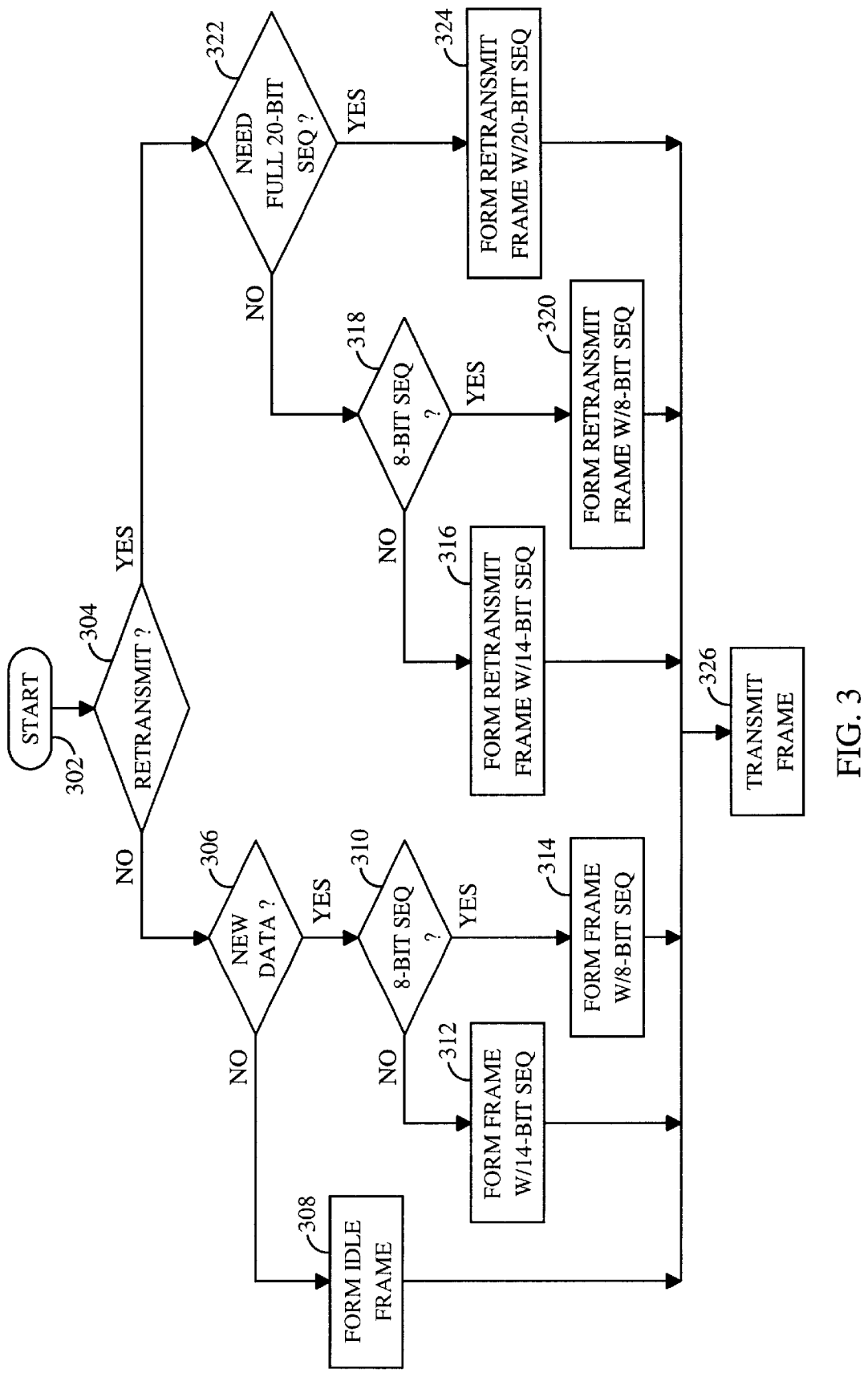
FIG. 3 is a flow chart of the steps used to transmit a data frame in accordance with an embodiment of the invention.

FIG. 3 is a flow chart of the steps used to transmit a data frame in accordance with an embodiment of the invention. In the start of frame transmission processing 302, the transmitter evaluates 304 whether the transmitter must transmit a new RLP transmit frame or an RLP retransmit frame. This decision is based on whether NAK frames specifying lost transmitted data have been received previously.

Before forming a transmit frame, a transmit data buffer or queue is inspected to determine 306 whether the transmitter has new data to send. If there is no data which needs to be sent, an idle frame is formed 308 and transmitted 326. The use of SYNC, ACK, and IDLE frames is detailed in the aforementioned RLP2. In one embodiment of the invention, idle frames are placed in smaller, lower-data-rate over-the-air frames to minimize the air link capacity impact of the idle frame transmission. In alternative embodiments of the invention, idle frames may not be transmitted at all, or are sent less frequently than every frame period.

If it is determined 306 that the transmitter has new data to send, the transmitter then evaluates 308 whether the data may be in a frame having an 8-bit RLP sequence number without causing sequence number ambiguity. If an 8-but sequence number causes no ambiguity, then an RLP transmit frame having an 8-bit RLP sequence number is formed 314 and transmitted 326. If the number of data bytes to be sent is less than the maximum for a full-rate frame, the frame formed 314 will have a length field. If the number of data bytes to be sent is greater than or equal to the maximum for a full-rate frame, then that maximum number of data bytes is inserted into a full-rate frame 314, and that frame is transmitted 326. The RLP sequence number inserted into new transmit frames at steps 312 or 314 is generated from the byte sequence number beginning the next unused page.

If the transmitter determines 304 that the transmitter must transmit an RLP retransmit frame, then the next step is to determine 322 whether a full 20-bit RLP sequence number is required in the next RLP retransmit frame. A full 20-bit RLP sequence number is required if the data to be retransmitted must be retransmitted in more RLP frames than were used to originally transmit the data, as is possible when channel capacity is decreased in-between transmission and retransmission. If the next frame must be sent with a 20-bit RLP sequence number, then an RLP retransmit frame is formed and filled with data 324, and transmitted 326 with an RLP sequence number corresponding to the first byte of data in the RLP retransmit frame. If the transmitter determines 322 that a 20-bit RLP sequence number is not necessary, then the transmitter must then choose 318 between the use of an 8-bit or a 14-bit RLP sequence number for the next retransmitted RLP frame. Once the determination of required sequence number bit-size is complete 318, the transmitter forms an RLP transmit frame with an 8-bit RLP sequence number 320, or forms an RLP transmit frame with a 14-bit RLP sequence number 316 and transmits the frame 326. In either case 316 or 320, the RLP sequence number inserted into the frame will be generated from the byte sequence number corresponding to the first byte of the data contained in the frame. That byte sequence number will be the first byte sequence number of a sequence number page. If necessary to avoid ambiguity about data size, the RLP header of the retransmitted RLP frame will contain a length field.

Figure 4:
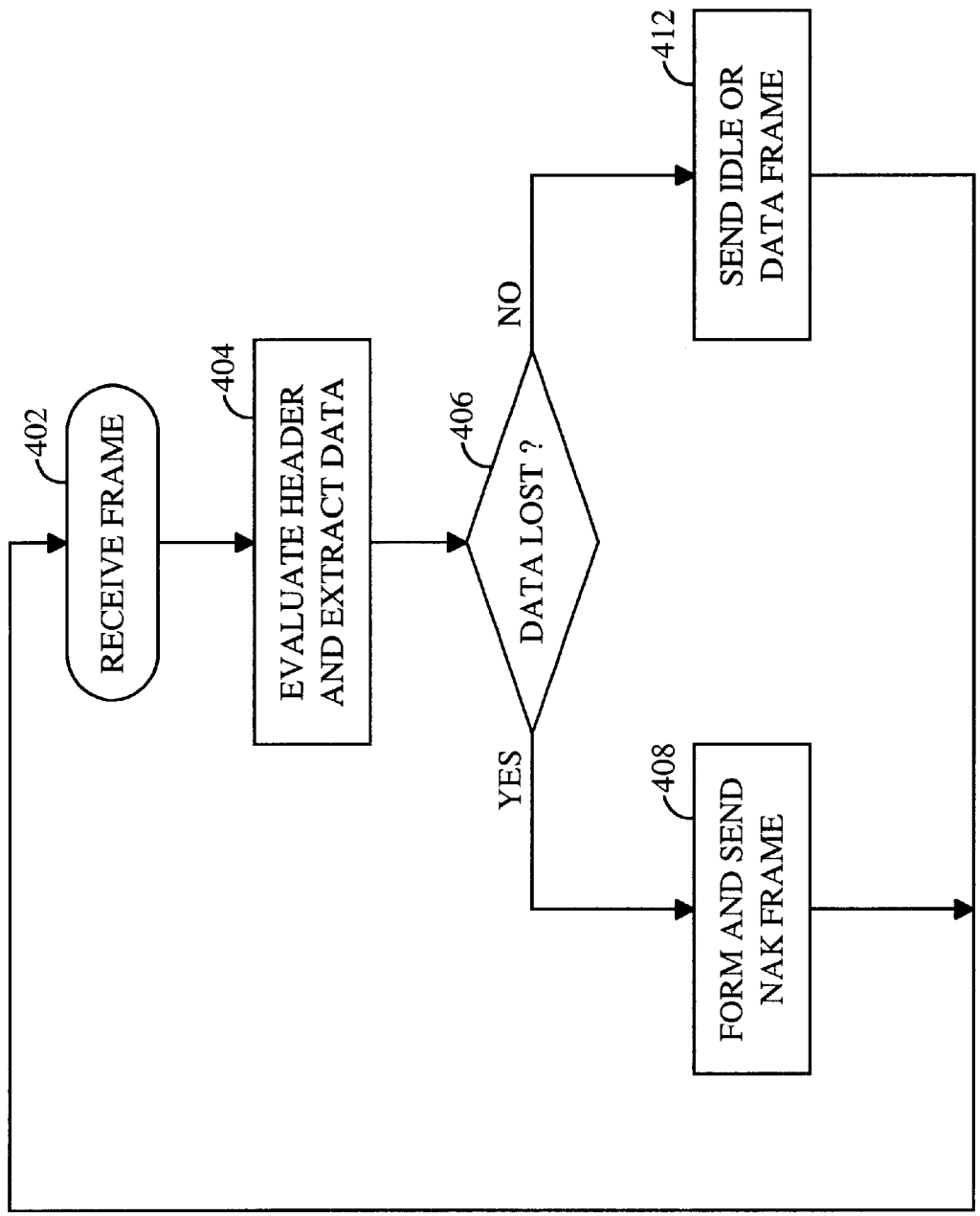
FIG. 4 is a flow chart of the steps used to extract data from a received data frame in accordance with an embodiment of the invention.

FIG. 4 is a flow chart of the steps used to extract data from a received data frame in accordance with an embodiment of the invention. Upon receiving an RLP data frame or an idle frame containing an RLP sequence number 402, the receiver expands the received RLP sequence number from the RLP frame as necessary to form a byte sequence number, and extracts any data bytes from the frame 404. The receiver then determines 406, from that byte sequence number whether RLP frames carrying data have been lost.

In an exemplary embodiment of the invention, the determination of lost data is made by comparing the byte sequence number indicated by the most recently received RLP data frame to the byte sequence number corresponding to the byte sequence number of the latest previous data byte successfully received. For example, the last byte of a received RLP data frame which is not a retransmission is considered the latest previous data byte successfully received. If the byte sequence number expanded from a received RLP data frame which is not a retransmission, or of a received RLP idle frame, is different by greater than a page from the sequence number of the latest previous data byte successfully received, then the loss of one or more lost RLP data frames has occurred.

The aforementioned RLP2 protocol describes the use of timers and frame counters in determining the loss of retransmitted RLP frames. These techniques are also used in embodiments of the current invention.

Upon determining that data has been lost 406, the receiver forms and sends a NAK frame 408 to request retransmission of the lost data. In an alternate embodiment of the invention, the receiver may specify, within the NAK frame, a reduced number of bits to be used in the RLP sequence numbers within retransmitted RLP frames, based on the receiver's knowledge of byte sequence number space of bytes successfully received.

Upon determining that data has not been lost 406, the receiver forms and sends RLP idle or RLP data frames as appropriate. In alternative embodiments of the invention, idle frames may not be transmitted at all, or are sent less frequently than every frame period.

Figure 5:
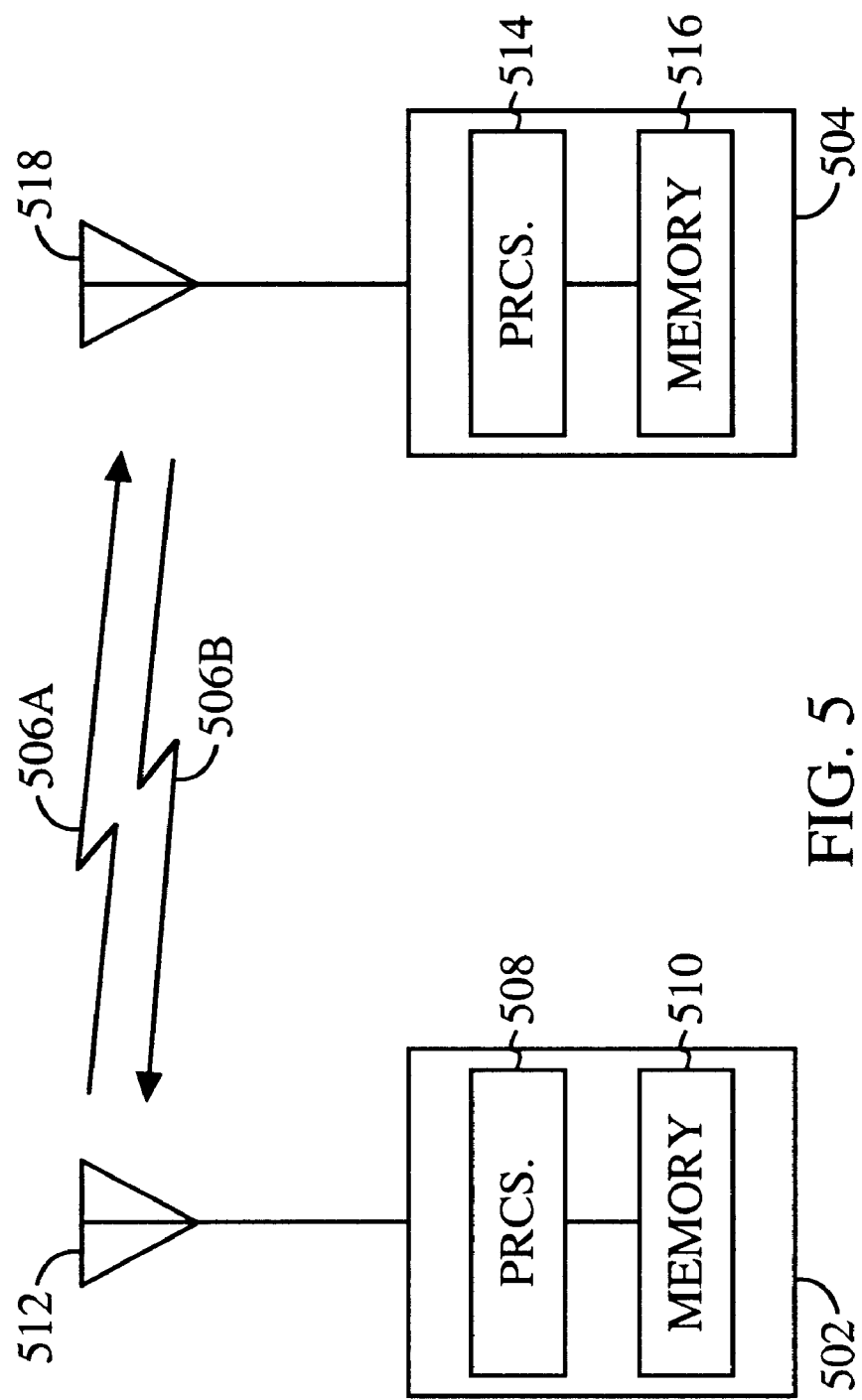
FIG. 5 is a diagram of a data communications system configured in accordance with an embodiment of the invention.

FIG. 5 is a diagram of a data communications system configured in accordance with an embodiment of the invention. As shown, transmitter 502 communicates with receiver 504 over a wireless communication channel 506. RLP data frames and control frames are sent from transmitter 502 to receiver 504 along channel 506a, and RLP acknowledgements or NAK's are sent from receiver 504 to transmitter 502 along channel 506b. During transmission, the capacity of transmission channel 506 may change, sometimes requiring retransmission of data over a channel of lesser capacity than used in the original transmission.

For example, a large, full-rate RLP data frame may be sent by transmitter 502 over channel 506a, but not received successfully by receiver 504. Then, the capacity of channel 506 is reduced either shortly before or shortly after receiver 504 sends a NAK frame for the lost data on channel 506b. Transmitter 502 must now distribute the data bytes from the original lost full-rate RLP data frame among several smaller RLP frames for retransmission over reduced-capacity channel 506b. If receiver 504 determines that one or more retransmitted RLP frames have been lost upon retransmission over reduced-capacity channel 506a, receiver 504 may individually NAK those individual lost retransmit frames over channel 506b.

In an exemplary embodiment of the invention, transmitter 502 includes a processor 508 connected to a memory 510 and an apparatus for wirelessly transmitting and receiving bytes processed by the processor 508. The processor 508 is provided with a byte stream to be transmitted over the transmit apparatus and forms transmissions in accordance with the enhanced radio link protocol (RLP) described hereinbefore.

In an exemplary embodiment of the invention, receiver 504 includes a processor 514 connected to a memory 516 and an apparatus for wirelessly transmitting and receiving bytes processed by the processor 514. The processor 514 is provided with received data received from the receive apparatus and forms response frames for transmission in accordance with the enhanced radio link protocol (RLP) described hereinbefore.

Figure 6:
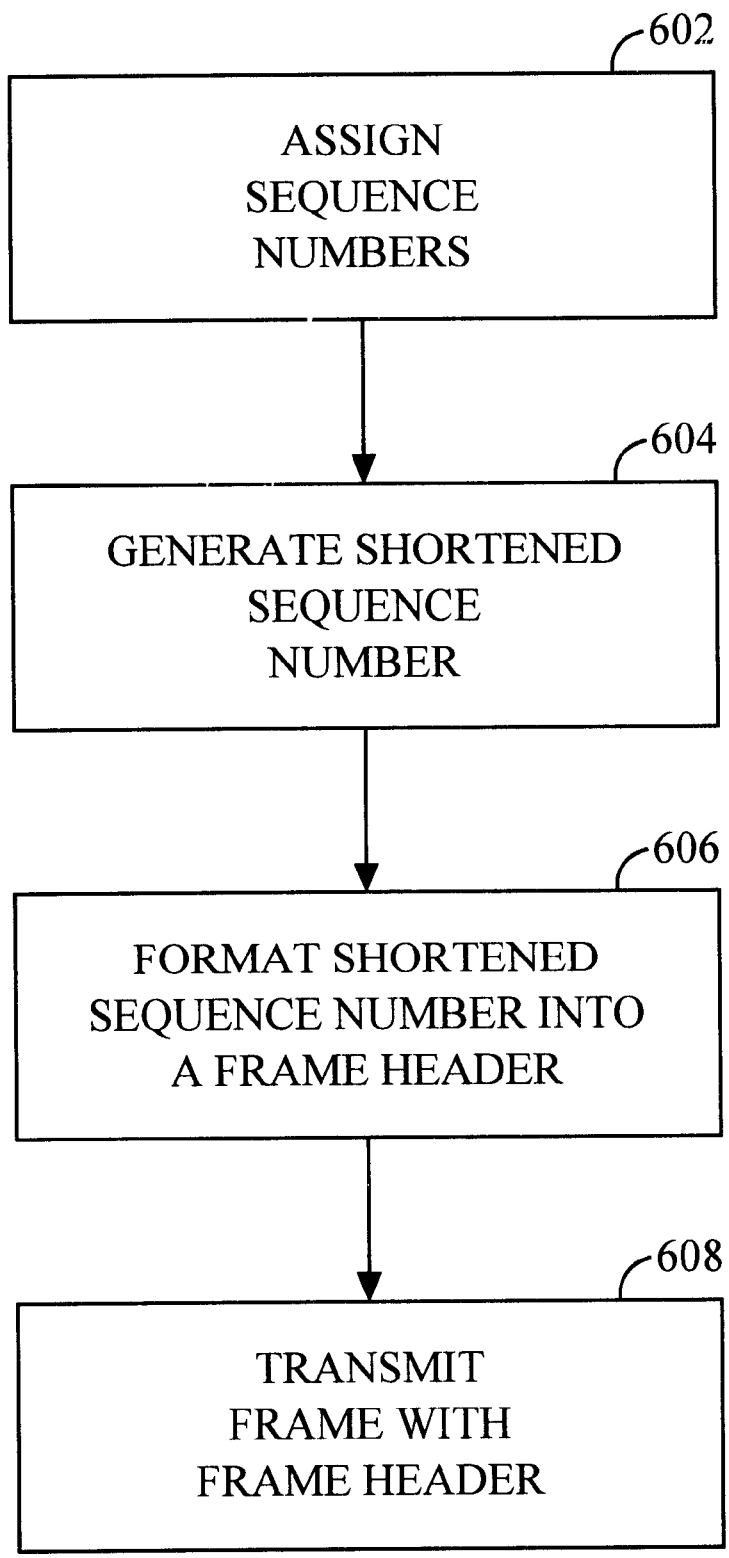
FIG. 6 is a flow chart showing the operation of the processor in the transmitter of FIG. 5.

FIG. 6 is a flowchart showing the operation of the processor 508. In step 602, a sequence number is assigned from a subset of a predetermined sequence number space to a set of information bytes. In step 604, a shortened sequence number is generated from the sequence number of the subset by dividing the sequence number by a predetermined page size. In step, 606 the shortened sequence number is formated into a frame header of a transmit frame. In step 608, the transmit frame with the frame header. and the set of information bytes are transmitted.

Figure 7:
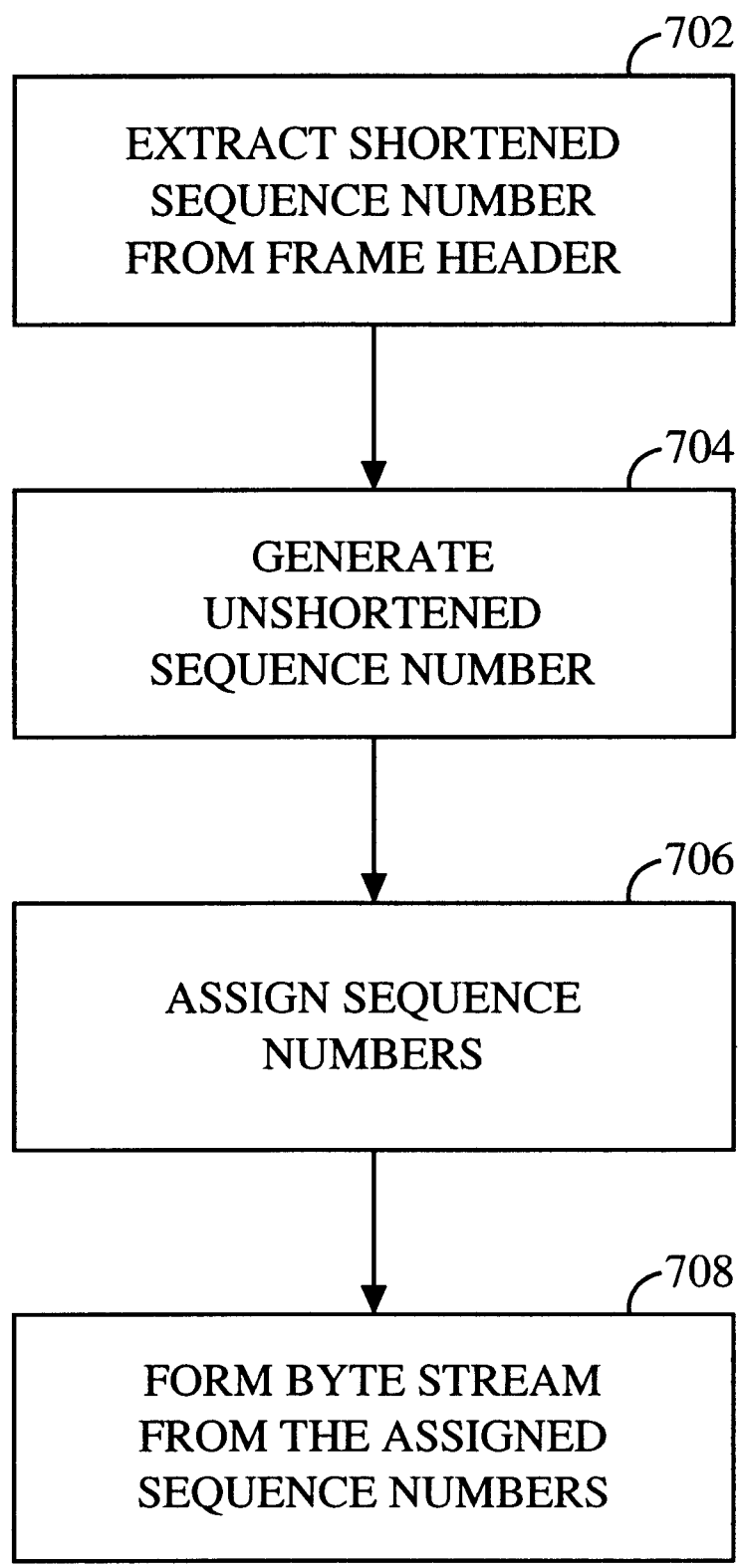
FIG. 7 is a flow chart showing the operation of the processor in the receiver of FIG. 5.

FIG. 7 is a flow chart showing the operation of the processor 514. In step 702, the shortened sequence number from the received frame of the frame header can be extracted. In step 704, an unshortened sequence number can be generated by multiplying the shortened sequence number by a predetermined page size. In step 706, sequence numbers can be assigned from a subset of a predetermined sequence number space to each of the information bytes in the received frame. In step 708, a stream of information bytes can be formed based on the sequence numbers.

the previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for transmitting a stream of information bytes comprising the steps of:
    a) assigning sequence numbers from a subset of a predetermined sequence number space to each of a set of information bytes from said stream of information bytes;
    b) generating a first shortened sequence number from a first sequence number of said subset by dividing said first sequence number by a predetermined page size;
    c) formatting said first shortened sequence number into a frame header of a transmit frame; and
    d) transmitting said transmit frame with said frame header and said set of information bytes.

2. The method of claim 1 wherein said step of generating said first shortened sequence number further comprises the step of performing a modulo function of said first sequence number using a predetermined modulo function base.

3. A method for receiving a stream of information bytes comprising the steps of:
    a) extracting from the frame header of a received frame a shortened sequence number;
    b) generating a first unshortened sequence number by multiplying said shortened sequence number by a predetermined page size;
    c) assigning sequence numbers from a subset of a predetermined sequence number space to each of a set of information bytes contained in said received frame; and
    d) forming said stream of information bytes from said sets of information bytes based on said sequence numbers.

4. The method of claim 3 wherein said step of generating said first unshortened sequence number further comprises the step of performing a modulo function of said first sequence number using a predetermined modulo function base.

5. A system for transmitting a stream of information bytes comprising:
    a) a transmitter for generating shortened radio link protocol (RLP) sequence numbers comprising quotients of unshortened RLP sequence numbers divided by a predetermined page size and transmitting data frames containing said shortened RLP sequence numbers and portions of said stream of information bytes; and
    b) a receiver for receiving said data frames and reconstructing said stream of information bytes from said portions based on said shortened RLP sequence numbers.

6. A system for transmitting a stream of information bytes comprising:
    a) transmitter means comprising a first processor and first memory for generating shortened radio link protocol (RLP) sequence numbers comprising quotients of unshortened RLP sequence numbers divided by a predetermined page size and transmitting data frames containing said shortened RLP sequence numbers and portions of said stream of information bytes; and
    b) receiver means comprising a second processor and second memory for receiving said data frames and reconstructing said stream of information bytes from said portions based on said shortened RLP sequence numbers.

7. A transmitter comprising a processor connected to a memory, the memory containing computer-executable instructions embodying a method for transmitting a stream of information bytes, the method comprising:
    assigning sequence numbers from a subset of a predetermined sequence number space to each of a set of information bytes from said stream of information bytes;
    generating a first shortened sequence number from a-first sequence number of said subset by dividing said first sequence number by a predetermined page size;
    formatting said first shortened sequence number into a frame header of a transmit frame; and
    transmitting said transmit frame with said frame header and said set of information bytes.

8. The transmitter of claim 7, wherein said generating further comprises performing a modulo function of said first sequence number using a predetermined modulo function base.

9. A receiver comprising a processor connected to a memory, the memory containing computer-executable instructions embodying a method for receiving a stream of information bytes, the method comprising:
    extracting from the frame header of a received frame a shortened sequence number;
    generating a first unshortened sequence number by multiplying said shortened sequence number by a predetermined page size;
    assigning sequence numbers from a subset of a predetermined sequence number space to each of a set of information bytes contained in said received frame; and
    forming said stream of information bytes from said sets of information bytes based on said sequence numbers.

10. The transmitter of claim 9, wherein said generating further comprises performing a modulo function of said first sequence number using a predetermined modulo function base.

11. A transmitter for transmitting a stream of information bytes, the transmitter comprising:
    means for assigning sequence numbers from a subset of a predetermined sequence number space to each of a set of information bytes from said stream of information bytes;

means for generating a first shortened sequence number from a first sequence number of said subset by dividing said first sequence number by a predetermined page size;

means for formatting said first shortened sequence number into a frame header of a transmit frame; and means for transmitting said transmit frame with said frame header and said set of information bytes.

12. A receiver for receiving a stream of information bytes, the receiver comprising:

means for extracting from the frame header of a received frame a shortened sequence number;

means for generating a first unshortened sequence number by multiplying said shortened sequence number by a predetermined page size;

means for assigning sequence numbers from a subset of a predetermined sequence number space to each of a set of information bytes contained in said received frame; and means for forming said stream of information bytes from said sets of information bytes based on said sequence numbers.

* * * * *